United States Patent [19]

Amano et al.

[11] Patent Number: 4,482,955
[45] Date of Patent: Nov. 13, 1984

[54] DATA TRANSFER SYSTEM FOR DATA ENTRY SYSTEM

[75] Inventors: Katsumi Amano; Takatoshi Ishii, both of Oume, Japan

[73] Assignee: Tokyo Shibaura Denki Kabushiki Kaisha, Kawasaki, Japan

[21] Appl. No.: 568,513

[22] Filed: Jan. 9, 1984

Related U.S. Application Data

[63] Continuation of Ser. No. 333,773, Dec. 23, 1981.

[30] Foreign Application Priority Data

Dec. 23, 1980 [JP] Japan .................. 55-181396

[51] Int. Cl.³ ............................................. G06F 1/00
[52] U.S. Cl. ................... 364/200; 340/365 S
[58] Field of Search ............ 340/365 S; 364/200, 364/900

[56] References Cited

U.S. PATENT DOCUMENTS

| | | | |
|---|---|---|---|
| 4,007,443 | 2/1977 | Bromberg et al. | 340/365 S X |
| 4,047,158 | 9/1977 | Jennings | 364/900 |
| 4,096,567 | 6/1978 | Millard et al. | 364/200 |
| 4,137,564 | 1/1979 | Spencer | 364/200 |
| 4,277,780 | 6/1981 | Sonderman et al. | 340/365 S |
| 4,408,291 | 10/1983 | Gunzberg et al. | 364/900 |

Primary Examiner—Gareth D. Shaw
Assistant Examiner—Ronni S. Malamud
Attorney, Agent, or Firm—Oblon, Fisher, Spivak, McClelland & Maier

[57] ABSTRACT

A data transfer system in which a data entry system is converted from manual operation to automatic reading in a computer system, thereby to save time in the inputting of data into the computer system. The data entry system includes a main processor having a central processing unit (CPU) and a keyboard unit including a microprocessor. Provision of the microprocessor at the keyboard enables physical separation of the keyboard unit from the CPU by means of only a single bi-directional cable. The CPU periodically sends polling data in serial data format via the bi-directional cable to the keyboard microprocessor, which then controls a keyboard matrix scanning operation in performing the commands represented by the polling data. The microprocessor then controls serial transmission of keyboard data to the CPU via the bi-directional cable. Thus the data transfer system is suitable for high performance data transfer between the CPU of the main processor and the microprocessor of the keyboard unit.

3 Claims, 12 Drawing Figures

DATA TRANSFER SYSTEM FOR DATA ENTRY SYSTEM

This application is a continuation, of application Ser. No. 333,773, filed Dec. 23, 1981.

BACKGROUND OF THE INVENTION

1. Field of the Invention

This invention relates to a data transfer system for a data entry system, and more particularly relates to a data transfer system from a keyboard to a central processing unit in the data entry system.

2. Discussion of the Prior Art

Recently, scanning type keyboards have been developed to sense "ON" and "OFF" states of key switches of the keyboard by arranging the switches in a matrix and by scanning the matrix using a central processing unit (CPU) and a LSI keyboard controller. The keyboard controller senses "ON" and OFF states of the switches during scanning of the matrix. If the keyboard controller senses an ON state of a switch, and after it confirms the ON state of the switch by means of a repeated scan, it requires an interruption to the CPU after it sets the X and Y matrix address of the switch in the ON state into its internal buffer.

Figure 1:
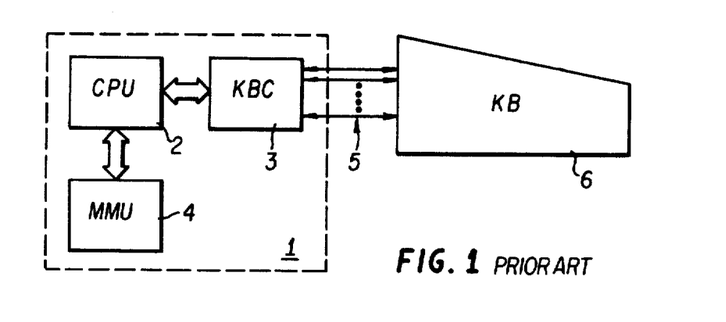
FIG. 1 is a block diagram of a prior art data entry system.

FIG. 1 shows a block diagram of the prior art data entry system. The keyboard controller (KBC) 3 controls the keyboard (KB) 6 by instructions of control programs stored in a main memory unit (MMU) 4 from the CPU 2. Namely the keyboard controller 3 which is connected to the keyboard 6 is required to send an interruption such as "key-in" to the CPU 2. Therefore, the CPU 2 is occupied not only in controlling the keyboard 6 but also in occupying the main memory unit 4 to control keyboard 6 and main memory unit 4 by means of the control program and a table for code exchange stored in the memory unit 4. On the other hand, other devices controlled by the CPU are denied access to the CPU during this time. With regard to the CPU, use of the CPU is very heavy duty, and then the data entry system 1 cannot attain high processing efficiency. Also, from the physical standpoint at the connection 5 between the keyboard 6 and the keyboard controller 3, it is necessary to use a big cable to make the connection when these units are apart from each other.

Typically, the prior art data entry system employs a INTEL 8278 (or 8279) programmable keyboard interface and a Digital Equipment Corporation VT 100 full keyboard.

SUMMARY OF THE INVENTION

Accordingly, it is a principal object of this invention to provide a new and improved data transfer system for a data entry system having a keyboard and a central processing unit to limit the duty time of the central processing unit and its memory by designing the keyboard with a keyboard controller integrally fabricated as a single chip microprocessor.

Another object of this invention is to provide a data transfer system for a data entry system having the keyboard separated from the central processing unit and easily connected thereto by means of a cable.

These and other objects are achieved according to the invention by providing a new and improved data transfer system for a data entry system having an interface between a main processor and a keyboard each of which has a transmitting and receiving means, including a cable connecting means for connecting the main processor to the keyboard, a command transmitting means for sending commands from the transmitting means of the main processor to the receiving means of the keyboard through the cable, whereupon the receiving means awaits for a resonse from the transmitting means of the keyboard in response to the transmitted commands, a responding means for sending response signals from the transmitting means of the keyboard to the receiving means of the main processor through the cable means after the main processor gives up use of the cable means to the keyboard while the main processor awaits the response to the command signals, and a control means for using the cable means as a half-duplex bidirectional cable to send the commands to the keyboard and to send key inputs from the keyboard to the main processor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 (a) and (b) are timing charts of the transmission states shown in FIG. 5;

DESCRIPTION OF THE PREFERRED EMBODIMENTS

Figure 2:
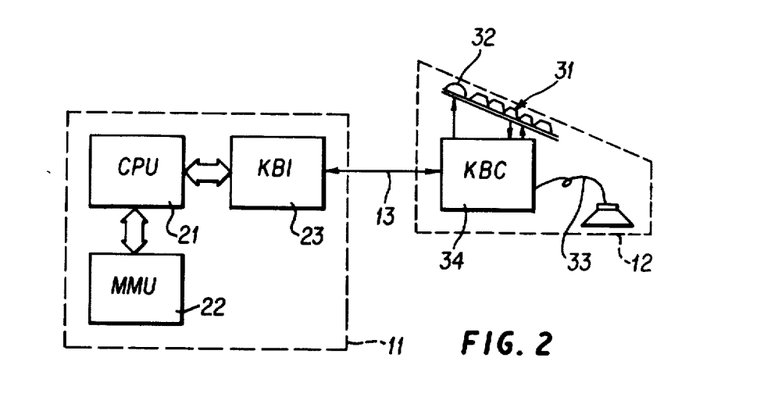
FIG. 2 is a block diagram of the data transfer system for the data entry system according to the invention.

Referring now to the drawings, wherein like reference numerals designate identical or corresponding parts throughout the several views, and more particularly to FIG. 2 thereof, wherein the data entry system using the data transfer system is shown, a main processor 11 connects the keyboard 12 through a cable such as single bidirectional line 13. The main processor 11 includes a central processing unit (CPU) 21, a main memory unit (MMU) 22 and a keyboard interface unit (KBI) 23. The keyboard 12 has a key matrix 31, a display portion 32, a speaker 33 and a keyboard controller 34.

Figure 3:
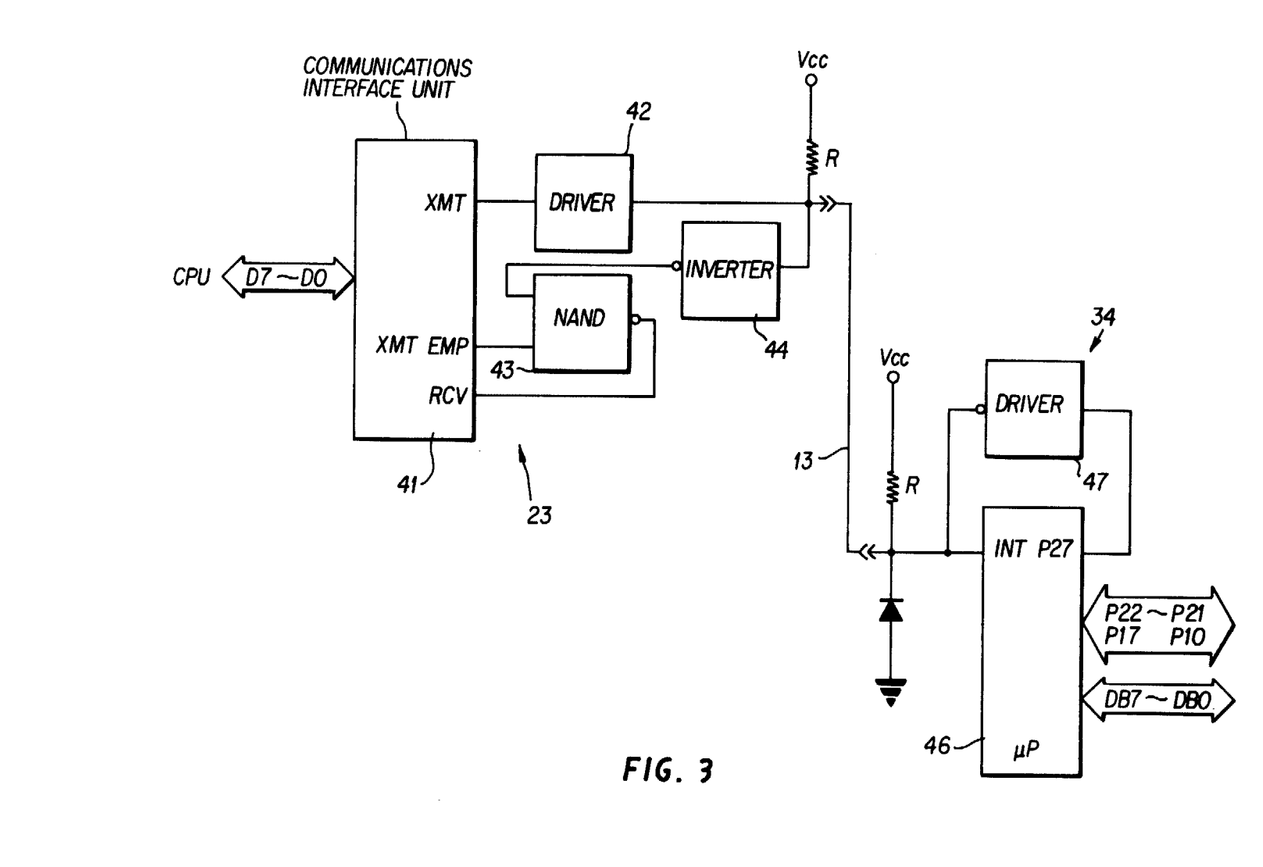
FIG. 3 is a more detailed block diagram of a main portion of the data entry system shown in FIG. 2.

In FIG. 3 a more detailed diagram of the construction of the keyboard interface unit 23, the single bidirectional lines 13 and the keyboard controller 34 is shown. The communication interface unit 41 performs a data communications function to receive parallel data from the CPU and convert the data to series data for transmission to the keyboard and to receive series data from the keyboard and convert the series data to parallel data for transmission to the CPU. The CPU can always know the states of the communication interface unit 41 because whenever the communication interface unit 41 receives the transmission data from the CPU or key inputs data from the keyboard, it has to notice them. In this embodiment, the communication interface unit 41 used is a programmable communication interface I 8251A produced by Intel Corp. The programmable communication interface is a programmable element used as peripheral circuits for microprocessors, and is capable of performing the functions as explained above. The programmable communication interface I 8251A is explained in detail in the Intel Component Data Catalog 1979 P11.24–P11.31. The communication interface unit 41 performs functions identified by the output leads as a transmitter data terminal (XMT), a transmitter empty terminal (XMT EMP) and a receiver terminal (RCV) as follows:

XMT:
The parallel characters loaded by the CPU are assembled in transmission formats defined by a mode instruction and are transmitted as series data from this terminal.

XMT EMP:
When there is no transmission character from the transmitting buffer, this terminal becomes "HIGH". In asynchronous mode the terminal is automatically reset because the next character is transferred to the transmitting buffer after it is loaded from the CPU. In synchronous mode the terminal immediately becomes "LOW" because the transmission buffer is automatically loaded with the SYNC character if it completes the transmission of the transmitting data characters.

RCV:
The terminal receives series characters from the keyboard to convert them to parallel characters for data of the CPU.

The XMT terminal is connected to the cable 13 through the driver 42 and to a source Vcc through resistor R. The XMT EMP terminal is connected to the RCV terminal through a NAND gate 43 whose other input is connected to the cable 13 through an inverter 44. Then the communication interface unit 41 can prevent return of transmitted data as received data and can receive data from the keyboard.

A microprocessor 46 included in the keyboard controller 34 in FIG. 2 operates key functions such as driving click sounds of the key, bells and the LED, scanning the key matrix, and converting key codes in accordance with the polling data for commands transmitted from the CPU. In this embodiment the microprocessor 46 used is the single chip 8-bit microcomputer (I 8048) produced by the Intel Corp. The microcomputer (I 8048) has a arithmetic logic unit (ALU) for processing data with 8 bits in parallel, a read only memory (ROM), random access memory (RAM), an input and output port (I/O port) and control circuits therefore, and is explained in detail in the Intel Component Data Catalog P8.22–P8.30 published by the Intel Corp. in 1979. In the microprocessor 46 the terminal (INT) has provided thereto the polling data in series from the terminal XMT of communication interface unit 41, the driver 42, and the cable 13 of the single bidirectional line. There are also shown keyboard return lines and the LED data line DB0–DB7, the I/O port I P10–P17, and the keyboard scan lines P21–P22. In the embodiment the scanning terminal has eleven lines and the return terminal has eight lines based on simple design choice. The driver 47 functions as an inverter and is connected between the terminal (INT) and the terminal P27 identified by the seventh terminal of the I/O port II.

Figure 4:
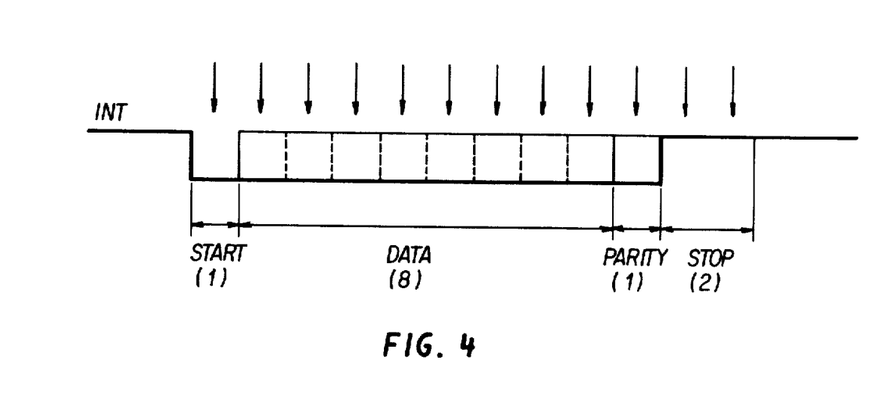
FIG. 4 is a timing chart of polling data and its sampling.

There are shown in FIG. 4 the polling data in series form transferred from the XMT terminal of the communication interface unit 41 to the INT terminal of the microprocessor 46 included in the keyboard and sampling timing shown by arrows. The serial polling data has a start bit (1), data bits (8), a parity bit (1), and stop bits (2).

Figure 5:
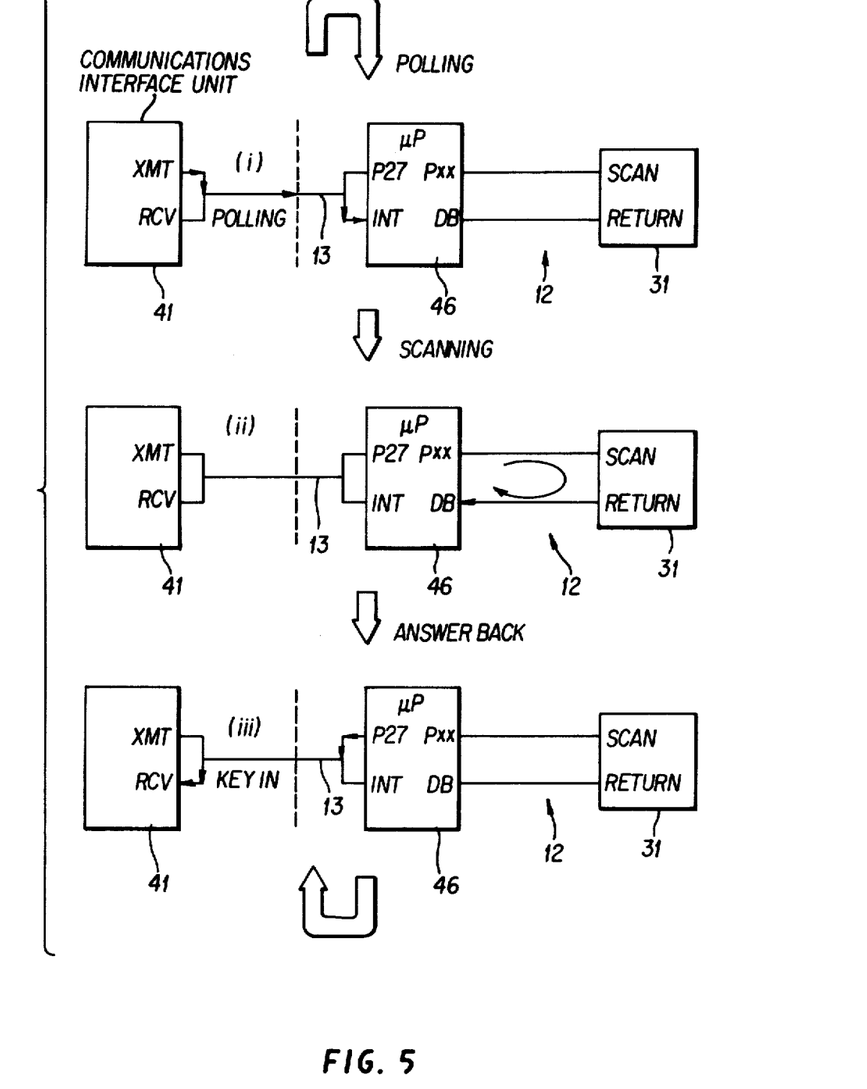
FIG. 5 is an operational block diagram of the transmission states of the signals between the main processor and the keyboard.
Figure 6A:
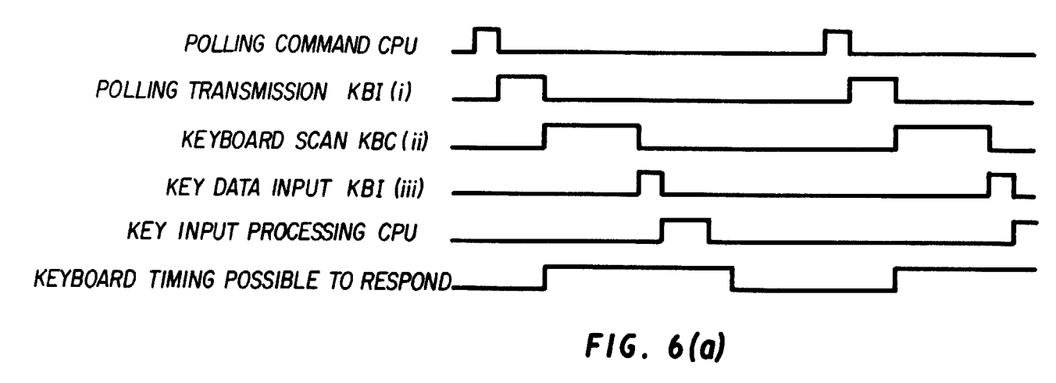
Figure 6B:
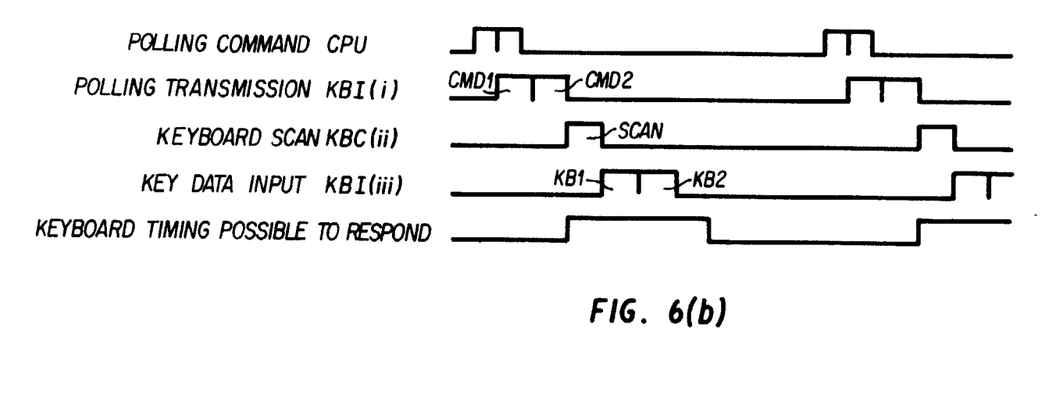

In FIG. 5 are shown operations for transferring signals between the main processor 11 and the keyboard 12 using bidirectional cable 13 in a half-duplex mode. There is shown a boundary of dotted lines separating the main processor 11 on the left side from the keyboard on the right side. The processing should be done in order of states (i), (ii) and (iii) and when it has been accomplished, it may repeat the same operation after a predetermined time. The state (i) shows start for polling, the state (ii) scanning, and the state (iii) answer back. The timing of such processing is shown in FIG. 6 (a) and FIG. 6 (b) for two cases, with the signals shown ordered from top to bottom as polling commands 21, polling transmission 23i, keyboard scan 34ii, key data input 23iii, key input processing 21, and keyboard timing possible to respond.

Figure 7:
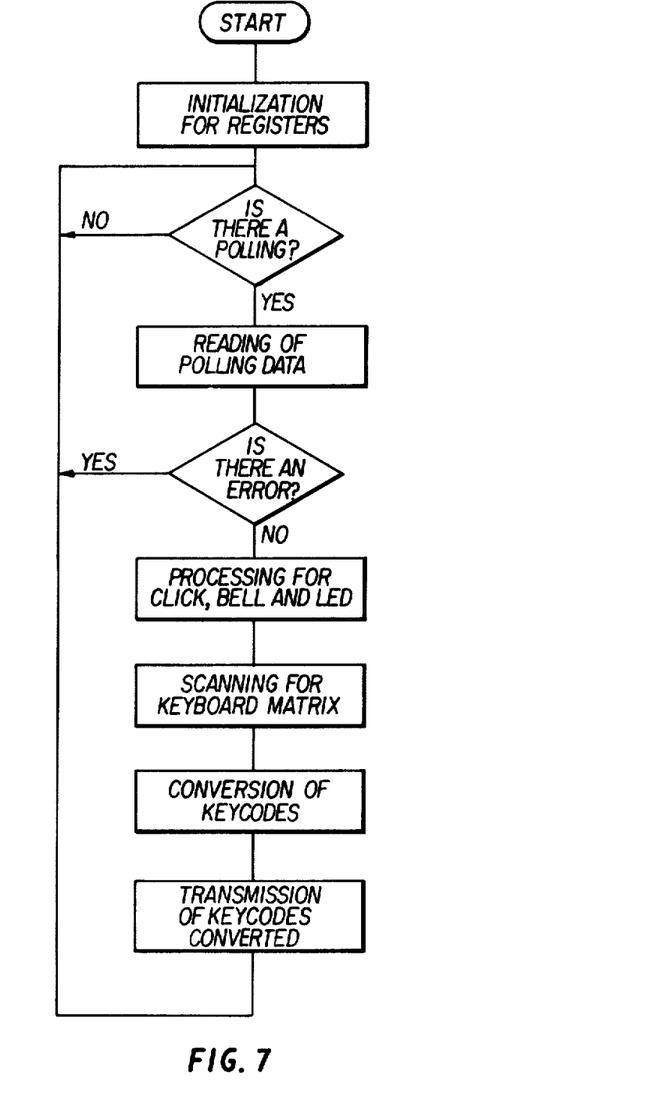
FIG. 7 is a flow chart indicating the processing steps of the single chip microprocessor of the keyboard.

FIG. 7 is a flow chart illustrating the processing steps of the microprocessor included in the keyboard.

Figure 8:
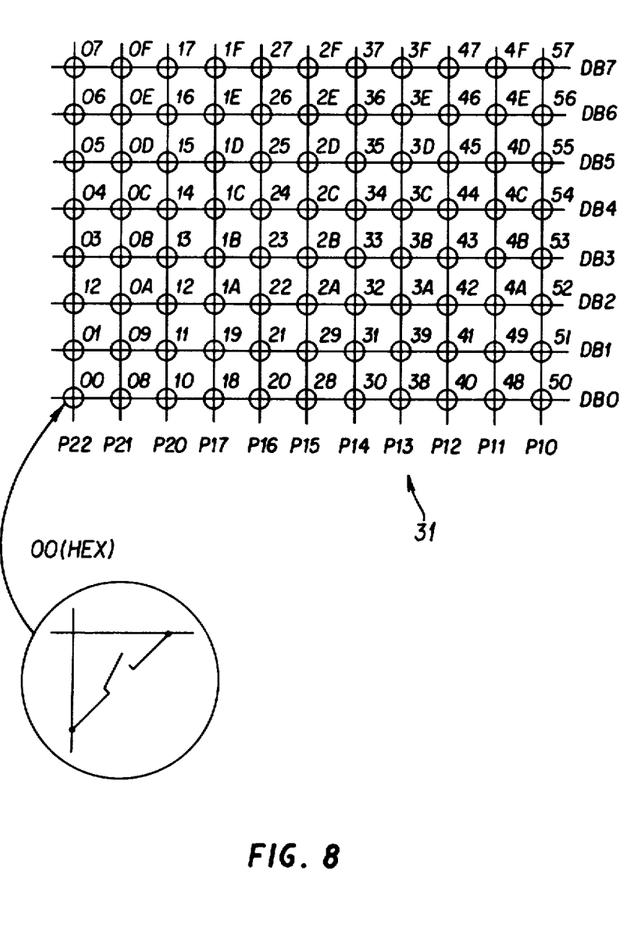
FIG. 8 is a block diagram illustrating the relation between the key matrix and terminals of the single chip microprocessor.

The relationship of the terminals between the key matrix 31 and the microprocessor 46 in FIG. 3 is shown in FIG. 8. The matrix 31 has eleven terminals for scan (P10–P17, P20–P22) and eight terminals for return (DB0–DB7).

Figure 9:
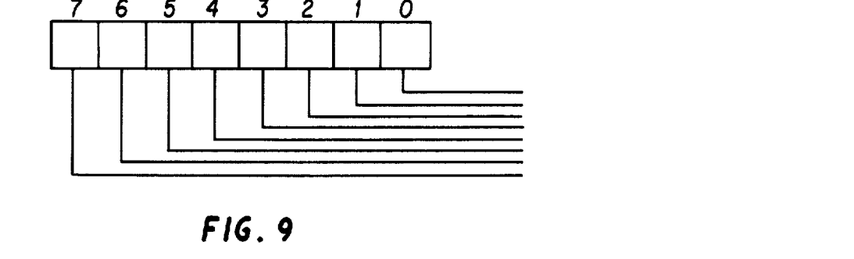
FIG. 9 is an illustration of the bit format of the polling data.

The polling data shown in FIG. 9 is arranged in a bit format identified as follows:

$b_0$:
designates the LED keyboard command bit 1–7 indicates the location of the LED on the LED command.

$b_1$:
designates a start command to start driving the bell.

$b_2$:
designates a continue command to continue driving the bell.

$b_3$:
determines whether the click sounds of the key are made or not.

$b_4$:
make the click sounds of the key from the CPU.

$b_5$:
determines whether the auto repeats of the key are effective or not.

$b_6$:
make located state the key.

$b_7$:
refuse the transmission of the key code from the keyboard.

Figure 10:
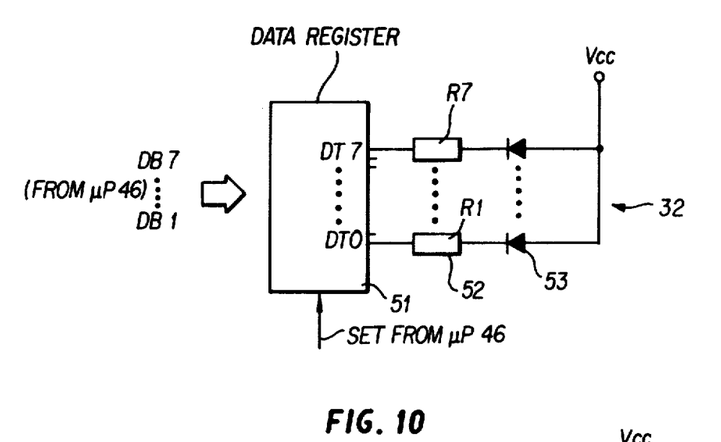
FIG. 10 is a circuit diagram of a switching circuit for an LED on the keyboard.
Figure 11:
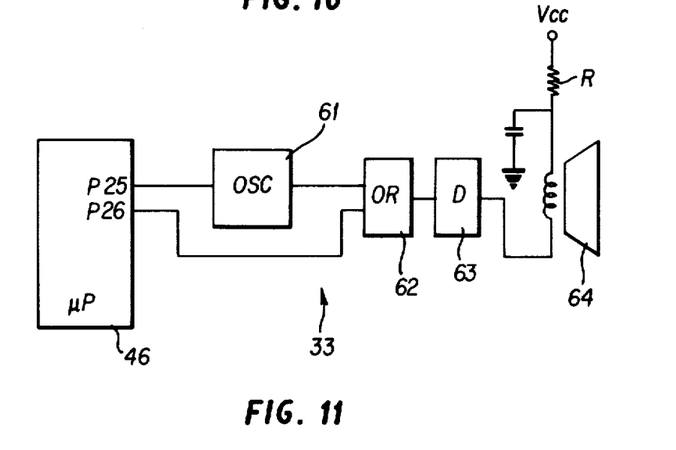
FIG. 11 is a circuit diagram of a driving circuit for a speaker.

The driving circuit for the LED's of the display 32 provided on the keyboard in FIG. 10 includes a data register 51 set by the microprocessor 46, resisters 52 and the LED's 53. FIG. 11 is a circuit diagram of a drive circuit for speaker 64 including an oscillation circuit 61 for making the bell sounds, an OR gate 62, a driver 63 and the speaker 64.

Nextly provided is a more detailed description of the operation of the system of the invention.

Referring to the FIG. 2, the CPU 21 of the main processor 11 makes polling to the keyboard 12 at a designed cycle time longer than the processing time of the microprocessor 46 of the keyboard. When the microprocessor 46 receives the polling data and detects the contents thereof, it variously controls the keyboard 12, and if some of the keys on the keyboard have been pushed, it produces respective character codes and stores them in the buffer of the RAM. Then it transmits the codes stored in the buffer to the main processor. The communications between the main processor 11 and the keyboard 12 takes place at the keyboard interface (KBI) 23. The microprocessor 46 operates only at the timing initialized by the polling from the main processor 11, and not otherwise. Therefore it is possible to connect the main processor 11 and the keyboard 12 by means of the single bidirectional line.

Referring to FIG. 3 when the communication interface unit 41 has written therein the polling data from the CPU of the main processor 11, it transmits the polling data in series out its XMT terminal. The first bit of the polling data is the start bit and zero level. If the microprocessor 46 of the keyboard receives the start bit, it makes its INT terminal active, then begins to accept the polling data from the main processor 11. After the microprocessor 46 processes the polling data and produces keyboard character codes, it transmits the codes to the main processor from its terminal P27 which is the seventh terminal of the I/O port II. The series data from the keyboard controller are received at the RCV terminal of the communication interface unit 41 where the data are processed as the data of the kebyoard.

Nextly explained in reference to FIG. 4 is the processing for transmitting and receiving. If the communication interface unit 41 sends the start bit "0" from its XMT terminal as mentioned above, the microprocessor 46 undergoes an interruption to make its INT terminal active. Then microprocessor 46 enters its program interruption routine and reads succeeding serial data transmitted from the XMT terminal by sampling the data at predetermined time intervals. There then takes place checking of the start bit, the parity bit and the stop bits to be able to recover error operations if error occurs for some reason. On the contrary, to transmit the keyboard data to the side of the main processor, the microprocessor makes its P27 terminal zero and the communication interface unit 41 makes its RCV terminal active. The microprocessor 46 sends the start bit in this way and then transmits the succeeding data, parity bit and stop bits in the requisite order to the main processor 11 at the designed timing.

When the CPU 21 of the main processor 11 makes polling through the communication interface unit 41 in FIG. 5, the cycle of the polling is typically 15-20 m seconds when the transmission speed is 4800 BPS (bit per second), because it necessarily takes about 2.5 m seconds to transmit the bits of the polling data shown in FIG. 5 (*i*), about 8 m seconds for the keyboard processing shown in FIG. 5 (*ii*), and about 2.5 m seconds to transmit the bits of the keyboard data shown in FIG. 5 (*iii*). The polling data has 12 bits of data for a start bit, data (8 bits), a parity bit, and stop bits (2 bits). The microprocessor 46 of the keyboard 12 reads every single bit of the polling data at the INT terminal. If there are some errors in the polling data, the processor 46 controls reading of the polling data with the timing as shown in FIG. 6 (*a*). The bidirectional lines 13 has the "1" level during the state (*ii*) at which no data is transmitted.

The keyboard controller 34 waits to receive the polling data after it undergoes initialization upon turning on the source. The processor 46 checks the polling data to detect errors upon receiving the polling data. If there is no error, the processor 46 operates to drive the click of the key, the bell, and the LED on the keyboard, and it scahs the keyboard matrix. The processor 46 uses the terminals $P_{10}$-$P_{17}$ and $P_{20}$-$P_{22}$ of the I/O port for the scan terminals, and the data bus $DB_0$-$DB_7$ for the return terminals to attain the above mentioned operations. The keyboard controller converts the location codes of the keys detected by the scanning in referring to the control keys, for example shift key and control keys, into the key codes used in the CPU, and stores them in the buffer of the processor. After the keyboard controller finishes this operation, the processor 46 transmits the bit pattern as serial keyboard data based on that stored in the buffer, in addition to the start bit, the parity bit and the stop bits from the P27 terminal. The bit pattern of the transferred data are input to the RCV terminal of the communication interface unit 41 through the driver 47, the bidirectional line and the NAND gate 43. At that time interface is available for receiving the keyboard data on its RCV terminal, because the transmitting buffer thereof is vacant and the XMT EMP terminals becomes "1" after the CPU 21 has finished the operations whereby the CPU assigns uses of the cable to the keyboard during the time period until the keyboard responds to the polling by the CPU.

The polling data and its processing will be more precisely explained referring to FIG. 9. The polling data is transmitted from the main processor 11 to the keyboard 12 where the microprocessor 46 utilizes the polling data as instructions from the main processor 11. First of all, it is determined by the bit 0 whether the instruction is an LED command or a keyboard command. If the instruction is an LED command others of bits 1-7 of the data designate which LED's have to be driven, so that it is possible to drive a maximum seven LEDs. If the instruction is a key command, others of bits 1-7 of the data designate to drive click sounds of the key and the bell, to make auto repeat, lock of the key, and to stop transmission of the key codes from the keyboard. After these operations, the keyboard controller scans the key matrix to obtain the key codes and to transmit them to the main processor 11.

In the drive circuit for driving the LED's shown in FIG. 10, the LED's 53 are driven by the data register 51 as determined by the program which provides the register with the LED data. If one of the terminals $DT_0$-$DT_7$ of the data register 51 becomes "0", the LED 53 connected thereto is lighted. At the drive circuit for the speaker in FIG. 11, the processor 46 supplies its terminal P25 for the bell and its terminal 26 for the click of the key. The processor 46 operates these signals under the control of program.

In FIG. 3, it is possible to omit the NAND gate 43 and the inverter 44, however, it is necessary to confirm the level of the line 13 so as not to receive the returned polling data upon their transmission.

It is also considered for various applications to change the definition of the bits of the keyboard commands and to design unused spaces of the key input code as control codes. For instance, there are applications with requirements for re-transmission if the parity error is detected, and for performing diagnostic functions. If more controls are required, it is possible to design the commands and their responses with a plurality of bytes as shown in FIG. 6 (b). If there is no key input, the keyboard can have no response or can transmit codes defining no key input. If the key inputs are performed very quickly, it is possible to transmit the keyboard data succeedingly under the control of the program of the CPU as shown in FIG. 6 (b).

Recapitulating, the present invention involves a data transfer system using a bidirectional cable between a main processor and a keyboard in which a serial data transfer technique is employed instead of the parallel data transfer techniques of the prior art. Therefore, the present invention reduces the number of signals between the main processor and the keyboard such that a very thin bidirectional cable therebetween can be used. According to the present invention, the CPU sends polling signals to the keyboad controller implemented by means of the Intel 8048 microprocessor at the keyboard which then sends the keyboard data to the CPU in response to the polling from the CPU. In contrast, the prior art Intel 8278 programmable keyboard interface sends an interrupt request and the CPU gets the keyed data. In the prior art, the keyboard controller clock of the DEC VT-100 full keyboard is supplied from the main system, and the polling (from the CPU) period and the response (from the keyboard) period is defined by a synchronization clock, that is, the data transmission control between the CPU and the keyboard is done using a time multiplex method. One period is used for the CPU transmission and another period is used for the keyboard transmission, each period occurring alternately. In the present invention, on the other hand, the main system (CPU) and the keyboard controller have independent clock generators, and the CPU sends the polling periodically and the keyboard controller responds to each polling. Moreover, the use by the invention of an 8048 microprocessor is further advantageous because code changes are easily accomodated simply by a key code table modification in the microprocessor ROM.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent in the United State is:

1. A data transfer system comprising:
   a main processor having a transmitting means and a receiving means;
   a scan type keyboard having plural keys corresonding to respective key-in data, a transmitting means and a receiving means;
   a bidirectional cable provided between said main processor and said keyboard;
   said main processor comprising command transmitting means for periodically and serially sending commands from said transmitting means of said main processor to said receiving means of said keyboard through said cable and control means for assigning use of said cable to said keyboard for a time period until said processor receives a response to said commands;
   said keyboard comprising processor responding means for continuously scanning said keys to detect a key actuation, for generating and storing the key-in data corresponding to an actuated key upon detection of said actuated key, and for sending said key-in data as response signals from said transmitting means of said keyboard to said receiving means of said main processor through said cable after said main processor assigns use of said cable to said keyboard during said time period; and
   said control means provided for using said bidirectional cable in a half duplex mode wherein said main processor sends said commands to said keyboard and said keyboard then sequentially responds by sending said response signals from said keyboard to said main processor.

2. A data transfer system according to claim 1 wherein said commands are a plurality of bytes.

3. A data transfer system according to claim 1 wherein said response signals from said keyboard are a plurality of bytes.

* * * * *